March 13, 1934.  R. B. WATKINS  1,950,583
BRAKE TESTING DEVICE
Filed Feb. 6, 1930  4 Sheets-Sheet 1
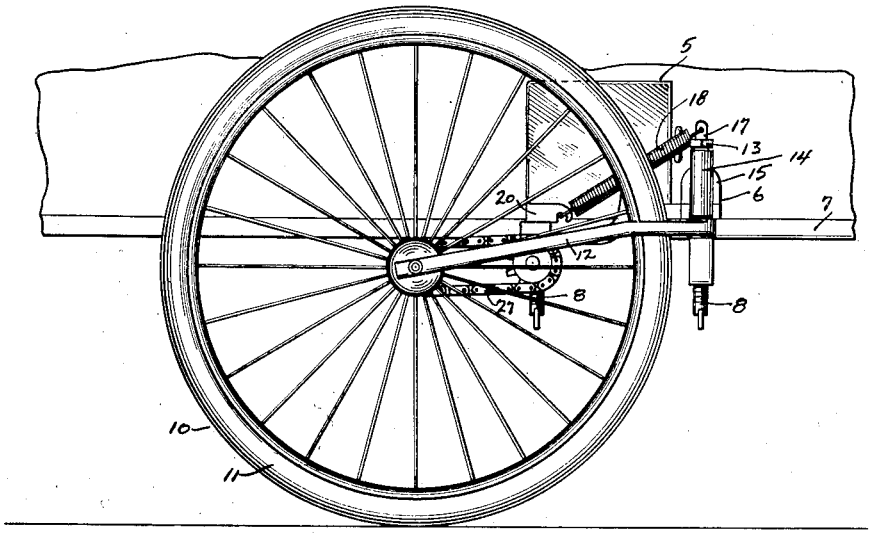
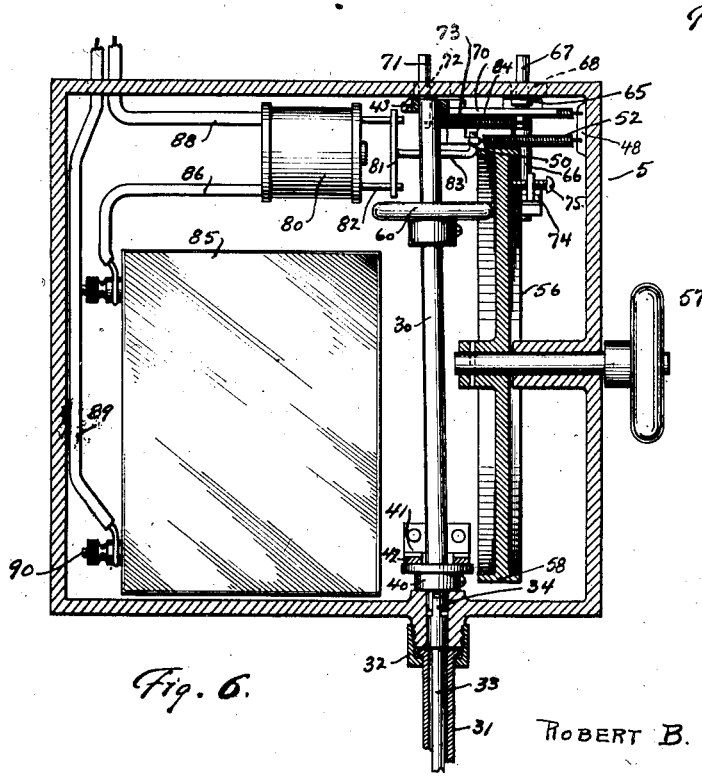
Fig. 1.
Fig. 6.
Inventor
Robert B. Watkins
By J. W. Ellis
Attorney

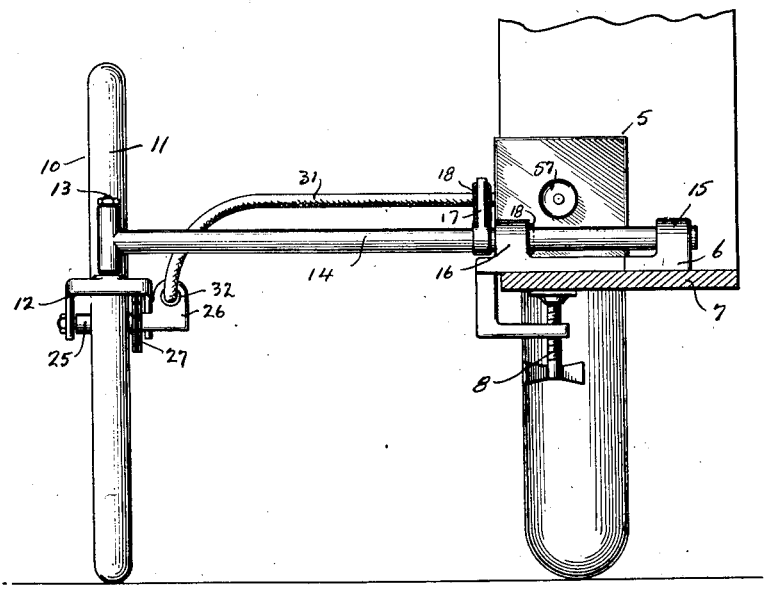
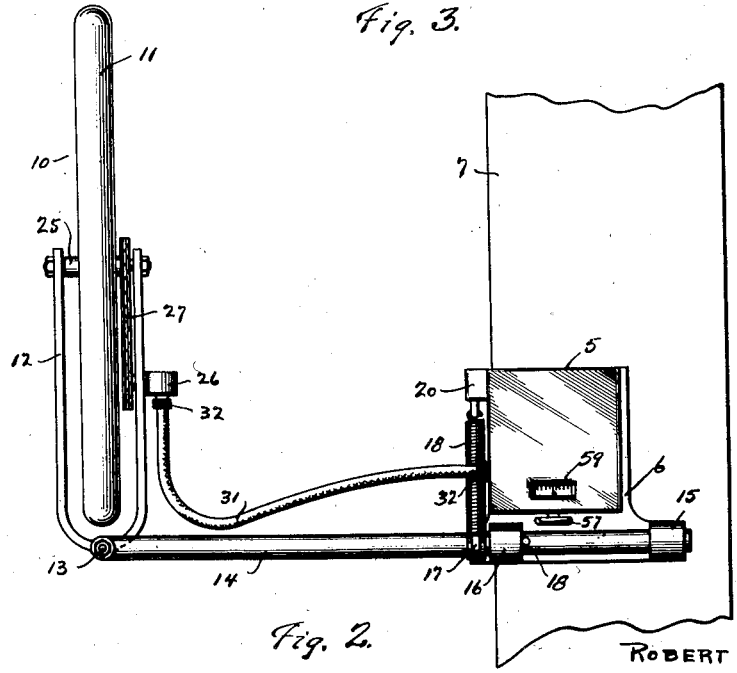

March 13, 1934.   R. B. WATKINS   1,950,583
BRAKE TESTING DEVICE
Filed Feb. 6, 1930   4 Sheets-Sheet 3

Inventor
ROBERT B. WATKINS

By

Attorney

March 13, 1934.     R. B. WATKINS     1,950,583
BRAKE TESTING DEVICE
Filed Feb. 6, 1930     4 Sheets-Sheet 4

Inventor
Robert B. Watkins
By
J. Wm. Ellis
Attorney

Patented Mar. 13, 1934

1,950,583

UNITED STATES PATENT OFFICE 1,950,583

BRAKE TESTING DEVICE

Robert B. Watkins, Buffalo, N. Y.

Application February 6, 1930, Serial No. 426,276

12 Claims. (Cl. 73—51)

It is well known to those skilled in the art that brake testing devices of the present day are designed to test the brakes of an automobile while the same remains stationary. Such devices, therefore, do not take into consideration, when testing the efficiency of the brakes, the momentum of the moving vehicle. Furthermore, they do not take into consideration the actual time element involved in the actuation of the brakes from the time the operator first touches the brake pedal to the time when the vehicle comes to a stop.

It has been an object of my invention, therefore, to provide a device which may be attached to any vehicle for efficiently testing its brakes under actual working conditions.

Another object has been to provide such a device which shall indicate the actual distance traveled from the time the brake pedal is first operated until such time as the vehicle comes to a stop.

Moreover, since in my invention it is the actual movement of the vehicle which governs the distance traveled during the braking period, my device will operate even though one or more wheels have become locked, and it will thus give the actual distance traveled by the vehicle in coming to a stop.

Furthermore, my device is of such a nature that it may be conveniently attached to any type of vehicle, and is so designed that it will measure the braking efficiency of the same at any desired speed thereof.

The above objects and advantages have been accomplished by the device shown in the accompanying drawings, of which:

Fig. 1 is a side view of my complete device attached to an automobile.

Fig. 2 is a plan view of the same.

Fig. 3 is a front elevation of the same.

Fig. 6 is a sectional, plan view of the same, taken on line 6—6 of Fig. 5.

Figure 4:
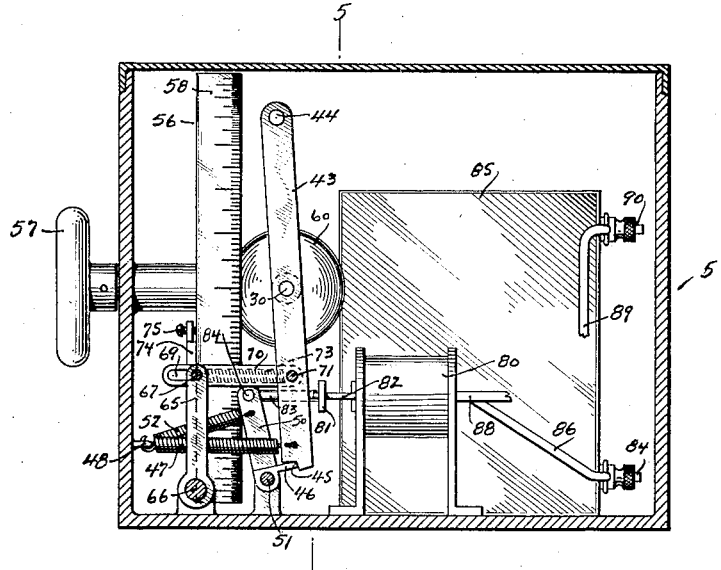
Fig. 4 is a sectional elevation of the indicating mechanism of my device and is taken on line 4—4 of Fig. 5.
Figure 5:
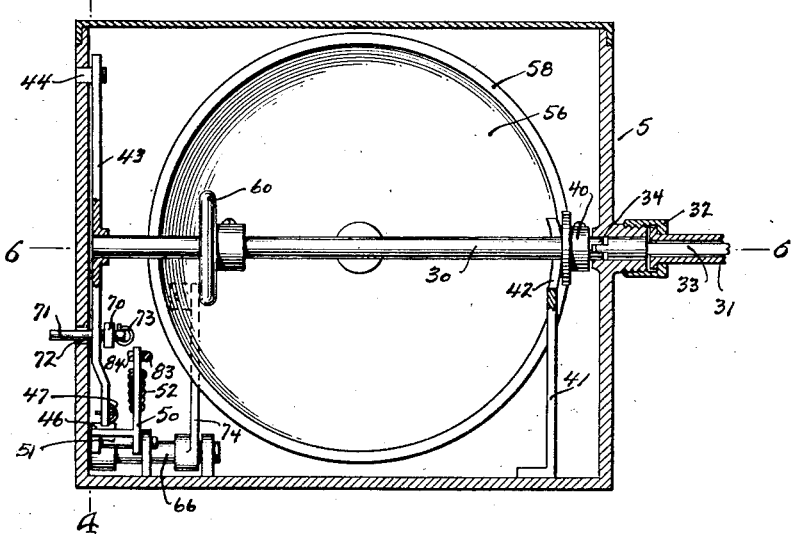
Fig. 5 is a sectional elevation of my device, and is taken on line 5—5 of Fig. 4.

My device comprises in general an indicating mechanism which is mounted within a casing 5. This casing is mounted upon a bracket 6 which is clamped to the running board 7 of the vehicle to be tested, preferably by means of clamp screws 8. Mounted along side the running board of the vehicle is a driving wheel 10, which may be in the form of the ordinary bicycle wheel having the usual rubber tire 11. This wheel is carried by a fork 12 which is arranged in a substantially horizontal position and which carries at its forward end a vertically arranged stem 13. This stem is rotatably mounted in an arm 14 which extends horizontally from the stem 13 and which is rotatably mounted in bearing lugs 15 and 16 of the bracket 6. A lever 17 is carried by the arm 14 and located preferably at one side of the lug 16. A stop pin 18 is located at the other side of this lug, whereby the arm 14 will be kept from moving endwise, but will be permitted to rotate. A helical spring 18 has one end attached to the lever 17 and its other end secured to a lug 20 carried by the bracket 6. By this arrangement the tire 11 of the wheel 10 is kept in firm contact with the pavement, while the fork 12 carrying the wheel is permitted to turn slightly as the vehicle is turned.

The wheel hub 25 of the wheel 10 is connected to a gear box 26 preferably by means of a sprocket chain 27 which engages with suitable sprockets carried by the hub and the gear box. The gears in the gear box 26 are preferably of the worm and worm wheel type, but, obviously, any suitable form of gearing may be employed. The driven shaft (not shown) of the gear box is attached to the operating shaft 30 of the indicating mechanism of my device by means of the well known flexible shaft connection 31. The connection is fastened to the gear box and to the casing 5 of the indicating device by means of the customary screw connection 32, and the shaft 33 of the connection is connected to the operating shaft 30 by means of the customary slotted joint 34. The connections between the driving wheel 10 and the operating shaft 30 may be varied somewhat, the object being, of course, to produce rotation of the operating shaft 30 in accordance with the rotation of the driving wheel.

The operating shaft 30 has the end which is connected with the shaft 33 of the connector 31 journaled in the casing 5. A thrust collar 40 is rigidly mounted upon this end of the shaft and is forced against the bearing of the casing by means of a spring 41 having a bifurcated upper end 42 which straddles the operating shaft 30 and bears against the face of the collar, whereby end play in the operating shaft will be avoided. The end of the operating shaft 30 where it is journaled in the casing 5 is relatively short and is slightly loose in its bearing so that it may have a slight swinging movement from the point where it is journaled in the casing 5, and the opposite end thereof is rotatably carried by a shaft lever 43. This shaft lever is pivotally attached to the casing at its upper end by means of the pivot pin 44. The lower end of the shaft arm 43 is provided with a notch 45 whereby the shaft arm is held in its outward position, as shown in the drawings, by the engagement of a trigger 46. A helical spring 47 is connected to the lower end of the shaft arm 43 at one end and to a ring 48 carried by the casing at the opposite end. This spring serves to urge the arm in a clockwise direction as viewed in Fig. 4, when released by the trigger, as hereinafter described.

The trigger 46 is carried by a trigger arm 50 which is pivotally mounted upon a trigger pin 51 carried by the casing. To the upper end of the trigger arm there is also attached a helical spring 52 which has its opposite end also connected with the ring 48 carried by the casing.

Mounted within the casing is an indicating disc 56. This disc is rotatably carried by the casing on an axis which is substantially at right angles to the axis of the operating shaft 30. A hand wheel 57 is carried on the outside of the casing and secured to the same shaft carrying the disc 56, whereby the disc may be manually rotated when it is returned to its initial position, as hereinafter described. The disc may be provided with a flat periphery 58, on which is marked or placed a suitable scale, preferably indicating feet and inches, and one portion of which is visible through a window 59 formed in the casing 5 (see Fig. 2). A friction drive wheel 60 is mounted upon the operating shaft 30 and is initially adjusted lengthwise thereon in accordance with the size of the tire 11 of the driving wheel 10, where it is fixed by means of a suitable set screw. This wheel is preferably provided with a frictional periphery and is brought into engagement with the side surface of the indicating disc 56, when the trigger 46 holding the shaft arm 43 is released, as hereinafter described.

A brake lever 65 is carried by a shaft 66, pivotally mounted in the casing and has at its upper end a pin 67, one end of which passes through a slot 68 in the casing (see Fig. 6) the other end of which passes through a slot 69 formed in a release link 70. The opposite end of the release link is pivotally attached to the shaft arm 43 by means of a reset pin 71 located at some point near the lower end of the shaft arm. The reset pin 71 extends outwardly through a slot 72 formed in the side wall of the casing, and also extends inwardly beyond the inner face of the shaft arm. A helical spring 73 serves to connect the pin 67 and the reset pin 71, whereby these two pins will be urged toward each other.

A brake arm 74 is carried by the shaft 66, to which the brake lever 65 is attached and the upper end of this arm comes opposite the face of the indicating disc 56, and it is provided at such end with a brake screw 75. The parts of my device are so adjusted that the brake screw 75 is in contact with the indicating disc and, therefore, serves to hold it by means of the spring 73 against rotation when the trigger 46 is engaged with the shaft arm. When the trigger 46 is released, the link 70 carried by the shaft arm 43 will serve to push the brake lever 65 in a counter-clockwise direction, as viewed in Fig. 4, and thereby also move the lock screw 75 out of contact with the surface of the indicating disc 56, thus allowing the disc to be rotated when the friction wheel 60 comes in contact therewith.

Mounted within the casing 5 is an electro-magnet 80 which is provided with an armature 81, carried by rods 82 which are slidably mounted within the electro-magnet. Secured to the armature 82 is an actuating rod 83. This rod has its outer end 84 bent at right angles and pivotally connected to the upper end of the release arm 50. One side of the winding of this electro-magnet is connected to one of the terminals 84 of an electric battery 85 by means of a lead 86. The other side of the winding of the electro-magnet is connected to the switch 87 of my device by means of the lead 88. The lead 89 connected with the other terminal 90 of the battery 85 is likewise connected to the switch. The battery 85 is preferably mounted within the casing 5.

Referring now particularly to Figs. 8 to 12, inclusive, my switch comprises two contact arms 91 and 92, which are insulated from the casing 93 and are connected, respectively, to the leads 88 and 89, extending, respectively, from the electro-magnet 80 and the battery 85. Since it is necessary in carrying out my invention that the device should be operated at the first touch of the brake lever, shown at 94 in Fig. 8, it is essential that the switch operate immediately. Furthermore, it is necessary that the brake lever be permitted to operate to the limit of its movement while still being attached to the switch means. These features are made possible by the structure shown in the drawings. A release button 95 is designed to enter, and be normally disposed within, an aperture 96 formed in one side of the casing 93. The inner end 97 of this button is designed normally to be disposed between the contact arms 91 and 92, serving to force these arms apart and thus maintain an open circuit. This button is mounted upon a cord or cable 98, the outer end 99 of which is looped about the pedal 100 of the brake lever 94. The inner end of this cable is wound about a drum 101, rotatably mounted within the casing 93 and connected with a spiral spring 102. This spring has its outer end 103 attached to a pin 104 carried by the drum 101, while its other end 105 is suitably secured to the pivot pin 106 of the drum, preferably by passing through a slot formed therein. This spring is so arranged that it will urge the drum in a direction which will wind the cable upon it. The switch 87 is provided with a clamp 107, whereby it may be fastened to the steering column 108 of the vehicle. The casing is so adjusted that the portion of the cable 98 which is on the outside thereof, will be drawn taut after its outer end has been secured to the pedal 100 of the brake lever 94, and when said lever is in its normal position.

When the brakes of a vehicle are to be tested by means of my device, the bracket 6 is clamped preferably upon the running board of the vehicle in such a position that the driving wheel 10 is disposed behind the stem 13 of the fork 12 thereof. The switch 87 is now placed about the steering column 108 of the vehicle, and the outer end 99 of the cable 98 is passed around the pedal 100 of the brake lever 94. The switch is now drawn up so that the cable is taut but not sufficiently so as to withdraw the contact button 95 from the casing 93. The switch is then secured by means of the clamp 107 in this position.

Figure 7:
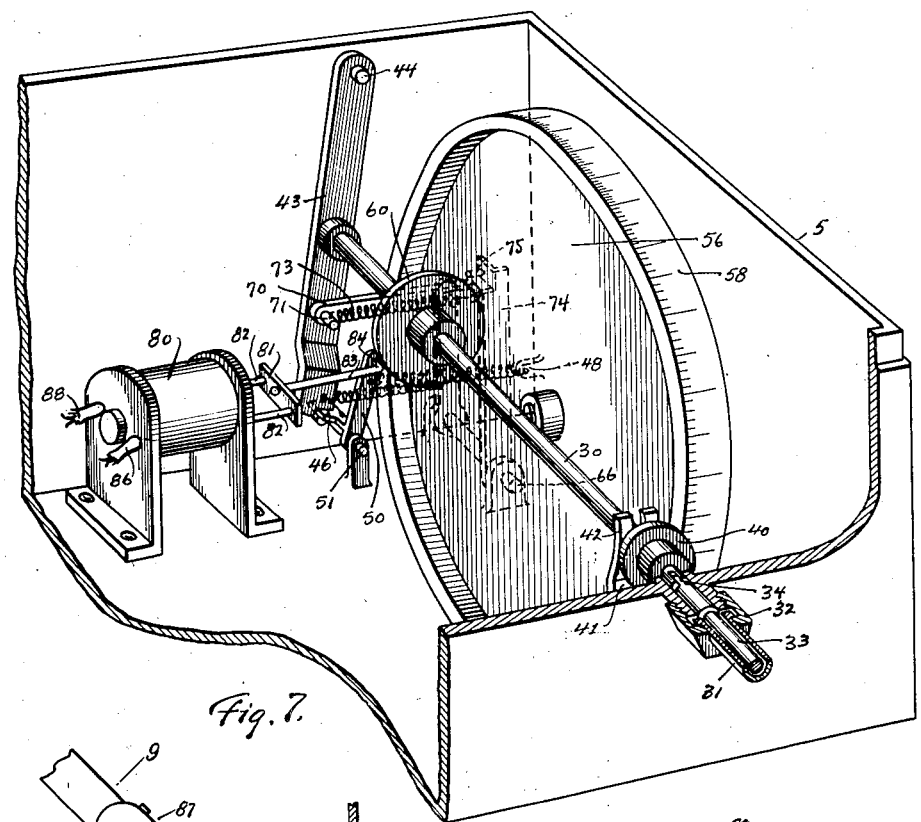
Fig. 7 is a perspective view of the indicating mechanism, portions of the casing being broken away.
Figure 8:
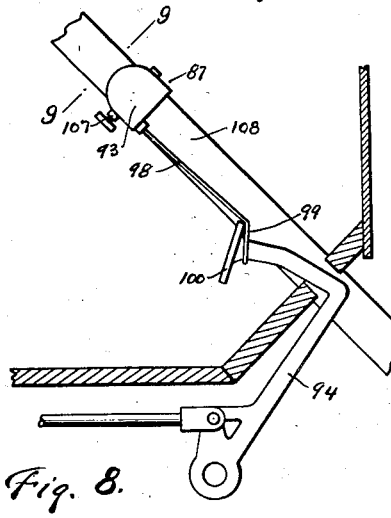
Fig. 8 is a fragmentary view, showing the brake pedal of a vehicle and the switch of my device connected thereto.
Figure 9:
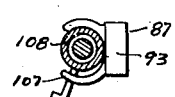
Fig. 9 is a sectional view of the steering column of the vehicle shown in Fig. 8, and is taken on line 9—9 of that figure.
Figure 10:
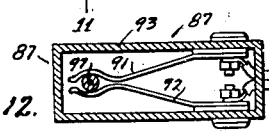
Fig. 10 shows an enlarged, sectional elevation of the switch of my device.
Figure 12:
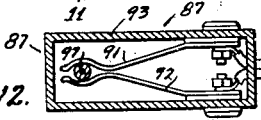
Fig. 12 is a transverse, sectional view taken on line 12—12 of Fig. 10.
Figure 11:
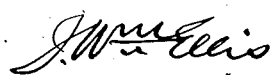
Fig. 11 is a sectional view thereof, taken on line 11—11 of Fig. 10.

The switch is, of course, connected electrically by means of the leads 88 and 89 to the electro-magnet 80 and battery 85, as hereinbefore described. The shaft arm 43 of the indicating mechanism is now moved to the position shown in Fig. 4 in which position it is held by means of the trigger 46. The trigger 46 will automatically be moved into engagement with the notch 45 of the shaft arm by means of the helical spring 52 which normally urges the release arm 50 in a direction which will cause the trigger to come into engagement. As the release arm is moved back as just indicated, the armature 81 of the electro-magnet 80, which is connected to said arm by the rod 83, will likewise be moved to its outward normal position, as shown in Figs. 4, 6, and 7. The friction drive wheel 60 is also moved out of contact with the indicating disc by the movement of the shaft arm. The shaft arm is moved to such position by means of the reset pin 71, which is manipulated from the outside of the casing. When the shaft arm 43 is moved to the position just above indicated, the helical spring 73 will draw the brake lever 65 over to the position shown in Fig. 4, in which position it will cause the brake screw 75 to be brought into contact with the indicating disc 56. If the indicating disc has not previously been set at zero, the brake screw 57 may be released from contact with the disc by means of the pin 67 which projects through the side of the casing, the inner end of the pin riding through the slot 69 during such movement. When released the disc may be brought to zero by means of the hand wheel 57, after which the pin 67 is released which allows the brake screw to be drawn back again into contact with the disc, thus holding it in position until the device is operated.

With the parts set as just above described, the device is ready for operation. When the car is put into motion, it will be obvious that the operating shaft 30 carrying the friction wheel 60 will be rotating in accordance with the speed of travel of the vehicle, such movement being conducted to the shaft by means of the flexible connection 31, sprocket chain 27 and driving wheel 10. The brakes of the vehicle may be tested at any desired speed and when such speed has been attained, the operator places his foot upon the pedal 100 of the brake lever 94 in the act of applying the brakes in the customary way. Any movement of the brake lever 94 will, of course, cause a corresponding movement of the cable 98. Since the portion of this cable between the switch and the foot pedal 100 is taut, it is obvious that the first movement of this pedal will serve to withdraw the contact button 95 from the casing 93 of the switch. The inner end 97 of this button will thus be immediately withdrawn from between the contact springs 91 and 92 of the switch, thus allowing these springs to move toward each other and thus close the electric circuit through the battery 85 and electro-magnet 80. During the further movement of the brake pedal the cable 98 will simply be unwound from the drum 101 as the drum is being rotated against the tension of the spring 102. Obviously, when the brake pedal is released, the cable will be wound up upon the drum by the spring.

When the contact springs 91 and 92 of the switch close the electric circuit as just above described, the electro-magnet will be energized, drawing its armature 81 toward the core of the magnet, and thus moving the release arm 50 against the tension of the spring 52. When the release arm 50 is thus operated, the trigger 46 actuated thereby will be moved out of contact with the recess 45 of the shaft arm 43, thus permitting the friction wheel 60 carried by the shaft 30 to be drawn into contact with the indicating disc 56. When the shaft arm 43 is thus released, the release link 70 will through the medium of the pin 67, brake lever 65, shaft 66, and brake arm 74 release the brake screw 75 from contact with the indicating disc 56, thus permitting the disc to be rotated by the friction wheel 60. Obviously, since the friction wheel is constantly rotating in accordance with the movement of the vehicle, this wheel will immediately cause the indicating disc to be rotated when it contacts therewith, and such rotation will be continued until the vehicle has been brought to a stop. Since my device is not connected with any of the wheels of the vehicle, the rotation of the indicating disc 56 will correspond to the distance traveled by the vehicle between the time when the operator first touched the brake pedal and the time of actual stoppage of the vehicle without any reference to whether one or more of the wheels have been locked and have brought the vehicle to a stop by means of sliding or skidding. When the vehicle has come to a stop the distance traveled can be read directly upon the periphery 58 of the indicating disc as viewed through the window 59 of the casing 5.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A brake testing device adapted to be carried by a vehicle, comprising an indicating mechanism secured to the vehicle, operating means carried by the vehicle and actuated in accordance with the movement of the vehicle but independently of the rotation of the wheels thereof, and means connected to the operating means and adapted to be actuated by the brake pedal of the vehicle for causing the indicating means to be actuated by the operating means during the period of brake testing.

2. A brake testing device adapted to be carried by a vehicle, comprising an indicating disc, a friction drive wheel optionally engageable with the disc, means for causing said wheel to be rotated in accordance with the movement of the vehicle, resilient means for drawing said wheel toward and holding it into engagement with the disc during the brake testing period, means normally retaining said wheel and disc out of engagement, and means adapted to be actuated by the brake pedal of the vehicle for releasing said last mentioned means to permit said wheel to be brought into engagement with the indicating disc during the period of brake testing.

3. A brake testing device adapted to be carried by a vehicle, comprising an indicating disc, a friction drive wheel so mounted as to be optionally movable into and out of engagement with the disc, means for causing said wheel to be rotated in accordance with the movement of the vehicle, an arm carrying said wheel, resilient means for drawing said wheel toward and holding it into engagement with the disc during the brake testing period, trigger means engageable with the arm for holding said wheel out of contact with the indicating disc, and means adapted to be actuated by the movement of the brake pedal of the vehicle for releasing the trigger means, whereby said wheel is brought into contact with the indicating disc and held in engagement therewith during the brake testing period.

4. A brake testing device adapted to be carried by a vehicle, comprising an indicating disc, a friction drive wheel optionally engageable with the disc, means for causing said wheel to be rotated in accordance with the movement of the vehicle, an arm carrying said wheel, resilient means for drawing said wheel toward and holding it in engagement with the disc during the brake testing period, trigger means engageable with the arm for holding said wheel out of contact with the indicating disc, brake means for normally holding the indicating disc in its initial position, means connecting the arm with the brake means, and means adapted to be actuated by the brake pedal of the vehicle for releasing the trigger means, whereby the brake means will be released and said wheel will be brought into contact with the indicating disc.

5. A brake testing device adapted to be carried by a vehicle, comprising an indicating disc, a friction drive wheel optionally engageable with the disc, means for causing said wheel to be rotated in accordance with the movement of the vehicle, an arm carrying said wheel, resilient means for drawing said wheel toward and in engagement with the disc during the brake testing period, trigger means engageable with the arm for holding said wheel out of contact with the indicating disc, an electro-magnet having its armature connected with the trigger means, and an electric switch adapted to be carried by the vehicle and actuated by the brake pedal thereof for causing the electro-magnet to be energized by the operation of the brake pedal, whereby said wheel is brought into contact with the operating disc.

6. A brake testing device adapted to be carried by a vehicle, comprising an indicating disc, an operating shaft arranged adjacent the disc, a friction drive wheel adjustably mounted upon the operating shaft and optionally movable into and out of engagement with the disc, means carried by the vehicle for causing the rotation of the operating shaft in accordance with the movement of the vehicle, a shaft arm for swingingly supporting one end of the operating shaft, resilient means for urging said wheel toward the disc, trigger means for holding said wheel in its inoperative position, and means adapted to be operated by the brake pedal of the vehicle for releasing the trigger arm, whereby said wheel is brought into contact with the indicating disc.

7. A brake testing device adapted to be carried by a vehicle, comprising a single indicating mechanism for registering the total effective power of the vehicle brake system, an operating wheel held in contact with the pavement on which the vehicle is traveling and actuated until the movement of the vehicle has been stopped, and means adapted to be actuated by the brake pedal mechanism of the vehicle for connecting the operating wheel with the indicating means during only the brake testing period.

8. A brake testing device adapted to be carried by a vehicle, comprising an indicating disc, an operating shaft arranged adjacent the disc, a friction drive wheel adjustably mounted upon the operating shaft and optionally movable into and out of engagement with the disc, means carried by the vehicle for causing the rotation of the operating shaft in accordance with the movement of the vehicle, a shaft arm for swingingly supporting one end of the operating shaft, resilient means for urging said wheel toward the disc, trigger means for holding said wheel in its inoperative position, brake means for the indicating disc, a link connecting the brake means with the shaft arm, whereby when the shaft arm is moved to bring said wheel into engagement with the disc, the brake means will be released, and means adapted to be actuated by the brake pedal of the vehicle for releasing the trigger means.

9. A brake testing device adapted to be carried by a vehicle, comprising an indicating disc, a friction drive wheel so mounted as to be optionally movable into and out of engagement with the disc, means for causing said wheel to be rotated in accordance with the movement of the vehicle, an arm carrying said wheel, resilient means for drawing said wheel toward and holding it in engagement with the disc during the brake testing period, trigger means for holding said wheel out of contact with the indicating disc, an electro-magnet having its armature connected with the trigger means, and an electric switch carried by the vehicle and adapted to be actuated by the brake pedal thereof for causing the electro-magnet to be energized by the operation of the brake pedal, the switch comprising a casing, contact springs carried by the casing, a contact button for keeping the springs separated, and a cable carried by the casing and adapted to be connected to the brake pedal of the vehicle for controlling the actuation of the button.

10. A brake testing device adapted to be carried by a vehicle, comprising an indicating disc, a friction drive wheel so mounted as to be optionally movable into and out of engagement with the disc, means for causing said wheel to be rotated in accordance with the movement of the vehicle, an arm carrying said wheel, resilient means for drawing said wheel toward and holding it in contact with the disc during the brake testing period, trigger means for holding said wheel out of contact with the indicating disc, an electro-magnet having its armature connected with the trigger means, an electric switch carried by the vehicle and adapted to be actuated by the brake pedal for causing the electro-magnet to be energized by the operation of the brake pedal, the switch comprising a casing, contact springs carried by the casing, a drum rotatably mounted within the casing, a cable carried by the drum, a contact button carried by the cable and engageable with the contact springs, the outer end of the cable extending through the casing and provided with means for attaching it to the brake pedal of the vehicle.

11. A brake testing device adapted to be carried by a vehicle, comprising an indicating disc, a friction drive wheel so mounted as to be optionally movable into and out of engagement with the disc, means for causing said wheel to be rotated in accordance with the movement of the vehicle, an arm carrying said wheel, resilient means for drawing said wheel toward and holding it in contact with the disc during the brake testing period, trigger means for holding said wheel out of contact with the indicating device, an electro-magnet having its armature connected with the trigger means, and an electric switch carried by the vehicle and adapted to be actuated by the brake pedal for causing the electro-magnet to be energized by the operation of the brake pedal, the switch comprising a casing, contact springs carried by the casing, a drum rotatably mounted within the casing, a spiral spring controlling the movement of the drum, a cable carried by the drum, a contact button carried by the cable and engageable with the contact springs, the outer end of the cable extending through the casing and provided with means for attaching it to the brake pedal of the vehicle.

12. A brake testing device adapted to be carried by a vehicle, comprising an indicating disc carried by the vehicle, a friction drive wheel optionally engageable with the disc, operating means carried by the vehicle and actuated in accordance with the movement of the vehicle but independently of the rotation of the wheels thereof, and means connected to the operating means and adapted to be actuated by the brake pedal of the vehicle for causing the indicating means to be actuated by the operating means during the period of brake testing.

ROBERT B. WATKINS.